United States Patent
Nagy et al.

(10) Patent No.: US 6,604,612 B2
(45) Date of Patent: Aug. 12, 2003

(54) VIBRATION DAMPER A HYDRAULIC MOTOR VEHICLE BRAKE UNIT

(75) Inventors: Imre Nagy, Eching (DE); Ernst Maier, Markt Schwaben (DE); Johann Mitterer, München (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/980,625

(22) PCT Filed: Mar. 21, 2001

(86) PCT No.: PCT/EP01/03219
§ 371 (c)(1),
(2), (4) Date: Dec. 5, 2001

(87) PCT Pub. No.: WO01/76926
PCT Pub. Date: Oct. 18, 2001

(65) Prior Publication Data
US 2002/0153209 A1 Oct. 24, 2002

(30) Foreign Application Priority Data
Apr. 5, 2000 (DE) .......................... 100 16 880

(51) Int. Cl.[7] .................................. F16D 55/18
(52) U.S. Cl. ........................ 188/72.4; 303/87
(58) Field of Search ................ 303/87, 119.2; 138/30, 31, 26, 37, 41; 188/72.4, 205 A, 381

(56) References Cited
U.S. PATENT DOCUMENTS

| 5,269,894 A | 12/1993 | Kerschbaumer |
| 5,460,438 A | 10/1995 | Hellmann et al. |
| 5,664,848 A | 9/1997 | Muraski |
| 5,820,227 A * | 10/1998 | Spero ..................... 303/87 |

FOREIGN PATENT DOCUMENTS

| DE | 3816349 | 11/1989 |
| DE | 19544223 | 6/1997 |
| EP | 0679832 | 11/1995 |
| EP | 0851109 | 7/1998 |
| GB | 2339875 | 2/2000 |
| JP | 9109857 A * | 4/1997 |

* cited by examiner

*Primary Examiner*—Christopher P. Schwartz
*Assistant Examiner*—Melanie Torres
(74) *Attorney, Agent, or Firm*—Crowell & Moring LLP

(57) ABSTRACT

A vibration damper for a hydraulic motor vehicle brake installation is provided with a membrane facing the hydraulic medium transferring the braking force which, with its edge region, is finally attached to a carrier element functioning especially as a brake piston in the brake saddle of a motor vehicle brake. The membranes can move at least slightly toward the carrier element or away from this in its central region, whereby the membrane together with a further membrane form a membrane unit. The two membranes are arranged basically one over the other, lie tightly one upon the other, and enclose between themselves a hollow space in the central region within this edge region. Preferably, the membrane facing the carrier element is set at a distance apart from the fastening section of the membrane unit and from the surface of the carrier element so that the space between the surface of the carrier element and the facing membrane stands in fluid connection with the hydraulic medium.

35 Claims, 2 Drawing Sheets

VIBRATION DAMPER A HYDRAULIC MOTOR VEHICLE BRAKE UNIT

BACKGROUND AND SUMMARY OF THE INVENTION

The invention concerns a vibration damper for a hydraulic motor vehicle brake installation with a membrane facing the hydraulic medium transferring the braking force which is finally fastened with its edge region on a carrier element functioning especially as a brake piston in the brake saddle of a motor vehicle brake which can move with its central region at least slightly toward the carrier element or away from this. Regarding the state of the art, reference is made to German Patent Document DE 195 44 223 A1 and to the not previously published German Patent Application DE 100 05 588.5.

It can be necessary to provide a vibration damper for a hydraulic motor vehicle brake installation with a membrane facing a hydraulic medium transferring a braking force, the membrane being fastened via an edge region to a carrier element functioning as a brake piston in a brake saddle of a motor vehicle, and the membrane being movable at least slightly toward the carrier element or away from the carrier element in a central region in a hydraulic brake installation in order to diminish undesired vibrations in the hydraulic system in this way, or to prevent small vibrations caused by any disturbing forces whatsoever from amplifying to a no longer tolerable intensity. Here a vibration damper of this type can also be designated as a "pressure smoother." For this purpose, spring-stressed vibration dampers, for example, can be used, but they are relatively expensive. A vibration damper known on the basis of the aforementioned German Patent Document DE 195 44 223 A1 and corresponding U.S. Pat. No. 5,730,506 is basically simpler, having a housing or a carrier element with a concavely constructed recess closed off by a disk-like membrane of spring plate. This membrane, which is subject to stress externally from the hydraulic medium of the brake installation, is welded on its edge side with the carrier element, and the hollow space between the membrane and the recess mentioned is filled with air. Pressure fluctuations arising in the hydraulic system occasion the membrane to move into the hollow space with its center region and away from the carrier element again, through which, with a suitable design, a vibration damping can be attained.

In order to prevent air from getting out of the hollow space between membrane and carrier element into the hydraulic system when the necessarily relatively thin and consequently weakly constructed membrane tears, it is proposed in the not previously published patent application DE 100 05 588.5 that the hollow space necessary for the membrane motion be evacuated to the greatest extent between the membrane and the carrier element.

It should now be pointed out with the present invention how a vibration damper of the above-mentioned kind can be more simply finished or manufactured, which is an object of the present invention.

The solution of this objective is characterized in that the membrane forms a membrane unit together with a further membrane whereby the two membranes arranged basically one over the other are fastened to each other in their annular edge section and thus lie tightly upon each other and enclose a hollow space between themselves in the central region within this edge section. Advantageous constructions and refinements are in the preferred embodiments.

While in the known state of the art the vibration damping takes place by means of a single membrane which is moved relative to a so-called carrier element where it is a matter of the brake piston of a brake saddle of the motor vehicle brake, and whereby the volume of a hollow space enclosed between this carrier element as well as the membrane is altered when the pressure prevailing in the hydraulic medium changes, a so-called membrane unit is provided according to the invention which consists of two membranes between which the aforementioned hollow space is situated whose volume is changed owing to pressure fluctuations in the hydraulic medium lying outside on at least one of the membranes.

With the known state of the art, the membrane must be joined tightly externally with the carrier element in order to create the hermetically sealed off hollow space for a successful vibration damping of pressure smoothing. With the present invention, the fastening of the membrane unit on the carrier element can basically be more simply configured. For example, with the known state of the art, the membranes are welded with the carrier element in their edge region, which is relatively expensive owing to the requisite tightness. However, according to the present invention, the membrane unit can simply be held in a suitable groove or the like in the carrier element. Of course, in this connection it is necessary to join the two membranes of the membrane unit tightly and firmly with each other in their annular edge section, for example likewise by welding, but this connection between two membranes lying on each other can be completed distinctly more simply than such a connection between a thin membrane and the carrier element/brake piston, which is plainly more massive by comparison.

It was already mentioned that the membrane unit can be fastened simply in a groove or the like provided in the carrier element, especially at the edge of a recess, namely by pressing in or insertion, but for example also in the manner of a bayonet lock. Preferably, this connection between membrane unit and carrier element or brake piston can here be constructed in such a way that the membrane facing the carrier element or its surface is set at a distance apart from the so-called fastening section of the membrane unit on the carrier element, and that the space between the surface of the carrier element and the membrane facing this and thereby set at a distance from this stands in fluid contact with the hydraulic medium. Then the membrane unit is namely acted upon from both sides, that is, on the outside of the two membranes forming this unit with the pressure fluctuations in the hydraulic medium, so that the entire surface of the membrane or the membrane bringing about the desired vibration damping is considerably enlarged, almost doubled, with unchanged dimensioning of the carrier element/brake piston. With pressure fluctuations in the hydraulic system, the two membranes of the membrane unit are consequently deformed.

In order to achieve a certain damping action, the material thickness of the membrane can be almost doubled with the measure just described in comparison with a membrane acted upon only on one side according to the known state of the art, which is extremely conducive to the durability of this vibration damping system. Nonetheless, evacuating the hollow space between the membranes as far as possible can be worth recommending even with a membrane unit of the invention in order to avoid the entry of air into the hydraulic medium in the event of a membrane tear or rupture.

The effective surface with respect to the desired effect, namely vibration damping, can be even further enlarged with specified dimensions of the carrier element, and the damping action can be once more enlarged if the membranes are constructed corrugated or wave-like at least area-wise. This wave shape can here be provided on the two membranes synchronously or asynchronously toward each other. In particular for reasons of toughness, selecting the geometrical dimensions such that, in the basically unstressed state of the membrane unit, that is, when no braking pressure is introduced into the hydraulic medium, the distance between the two membranes forming the center of the central region is greater near the already mentioned so-called edge ring, on which the two membranes lying on each other are fastened to each other, can furthermore be worth recommending.

Other objects, advantages and novel features of the present invention will become apparent from the following detailed description of the invention when considered in conjunction with the accompanying drawings.

BRIEF DESCRIPTION OF THE DRAWINGS

The invention is explained below on the basis of two preferred embodiments

DETAILED DESCRIPTION OF THE DRAWINGS

Figure 1A:
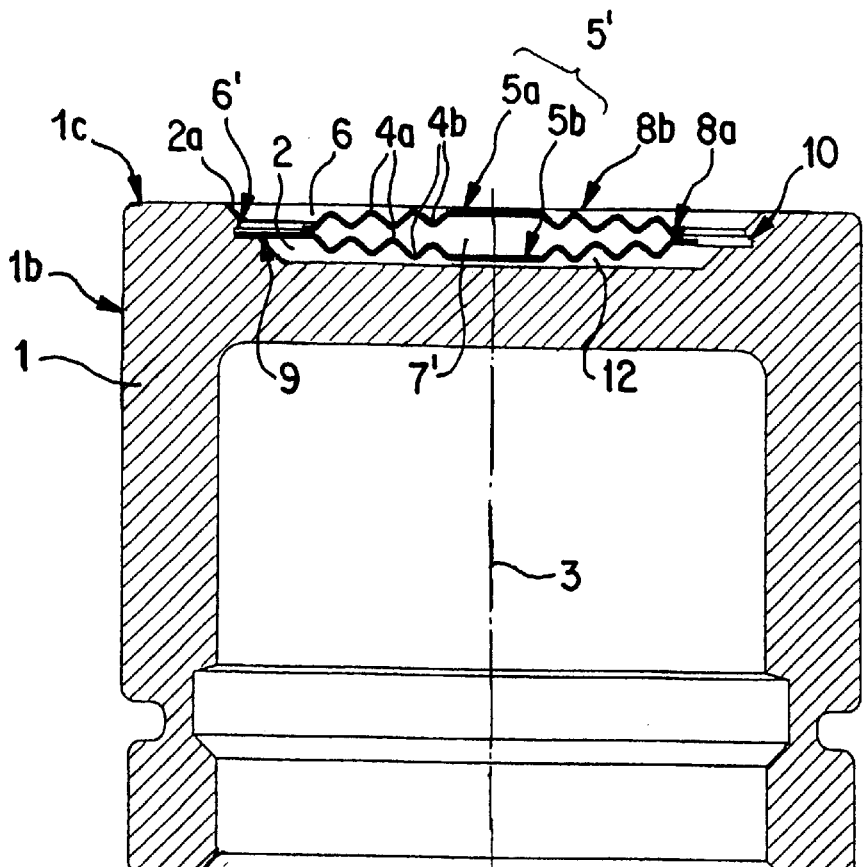
FIG. 1a shows the cross section (section A—A from FIG. 1b) of a first vibration damper of the invention.

The so-called carrier element of the vibration damper is designated with reference number 1, which at the same time is the brake piston provided in the brake saddle of an otherwise typical motor vehicle brake installation. As usual, a brake lining carrier lies on the front side (below in FIGS. 1a, 2a) of this cylindrical brake piston 1 or carrier element 1 which, with its cylinder jacket surface 1b, is guided movably in a not represented cylinder. The front side 1c lying opposite front side 1a is as usual acted upon by the hydraulic medium transferring the braking force.

In front side 1c, a circular depression 2 is provided in carrier element 1 which is constructed quasi-trough-like, that is, the edge 2a of depression 2, or recess 2, is inclined toward the central axis 3 of the carrier element. A so-called membrane unit 5' is inserted into this depression 2 or recess 2 which comprises two basically annular membranes 5a, 5b arranged one above the other in the direction of the central axis. These membranes 5a, 5b lie tightly upon each other in their annular edge section 8a and are fastened to each other in this annular edge section 8a, while in the central region 8b are set at a distance from each other within this edge section 8a and enclose a hollow space 7' between themselves. The aforementioned fastening of the two membranes 5a, 5b to each other or their tight connection with each other is here realized by way of a circular welding seam 6.

Three bars 9 distributed evenly over its periphery project outwardly from the edge section 8a of the here lower membrane 5b, that is, directed away from the central region 8b. The membrane unit 5' is fastened to the carrier body with these bars 9, and indeed such that these bars 9 engage into a circular groove 10 provided in the edge 2a of recess 2. In the embodiment according to FIGS. 1a, 1b, the membrane unit 5' is inserted with these bars into groove 10 by simple elastic deformation in particular of the bars 9, and the dimensioning of groove 10 and the configuration of the edge 2a is selected such that the membrane unit 5' can be simply pushed in from above (that is, along central axis 3 to the carrier element 1) similar to a clip connection. In the embodiment according to FIGS. 2a, 2b, the membrane unit 5' is fastened on carrier element 1 in the manner of a bayonet lock, or such that the bars 9 are inserted into groove 10.

Figure 2A:
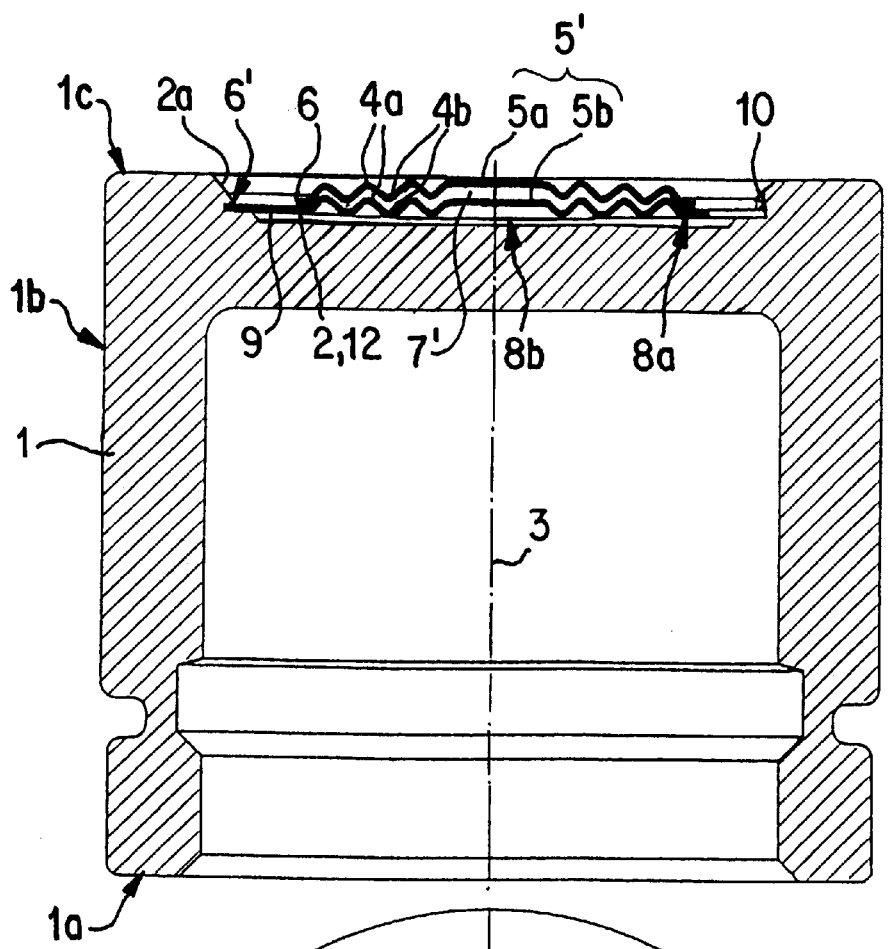
FIG. 2a shows a second embodiment of a vibration damper in cross section.
Figure 2B:
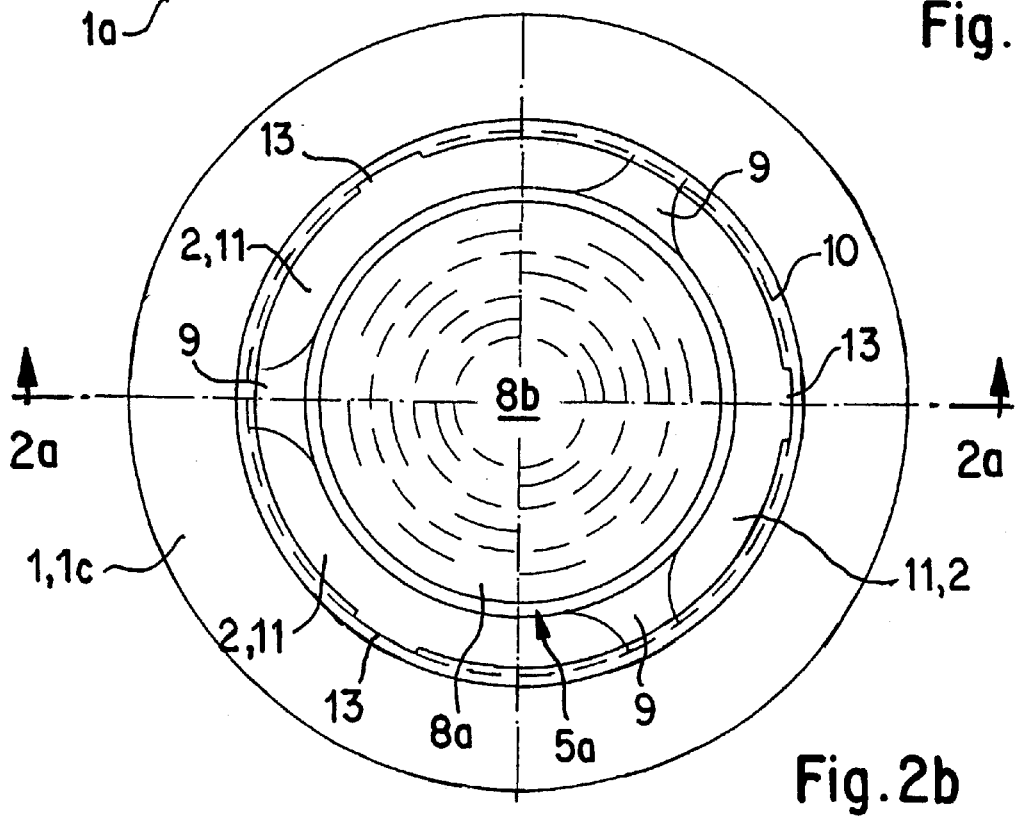
FIG. 2b shows the second embodiment in plan view.

As FIG. 2b shows, with these bars 9, corresponding notches 13 are provided on edge 2a of depression 2 through which the bars 9 (together with membrane unit 5') can first of all be inserted into groove 10. After this, the membrane unit 5' is rotated by a certain angle amount around central axis 3, after which bars 9 come to lie in the position represented in the figure, from which they cannot slide out of the groove 10. A not represented anti-rotation element here prevents the bars 9 from being capable of being rotated with the membrane unit 5' back into the so-called insertion position.

With the two embodiments, the (lower) membrane 5b facing the surface of carrier element 1 is apart from the so-called fastening section 6' which is formed by bars 9 in interaction with groove 10, set at a distance from the surface of the carrier element 1 (in the area of recess 2). At the same time, the space 12 formed in this way between the surface of the carrier element 1 and the membrane 5b facing this and thereby set at a distance from this stands in fluid contact with the hydraulic medium through intermediate spaces 11 between the bars 9 As already mentioned, the hydraulic medium transferring the braking pressure lies namely on the (upper) front side 1c of the carrier element 1/brake piston 1, and consequently also on the exterior of the (above) membrane 5a facing away from hollow space 7'.

If basically no forces are acting on the free surface of membrane 5a accessible from the outside, that is, facing toward the hydraulic medium of the hydraulic system of the braking installation, then membrane 5a is set at a distance from membrane 5b, since likewise no forces are acting on the latter, coming through the intermediate spaces 11 almost from carrier element 1. Between the two membranes 5a and 5b of membrane unit 5', the already mentioned hollow space 7' is consequently situated, which preferably is evacuated to the greatest extent, such that basically a vacuum prevails in this hollow space 7'. If the hydraulic system or hydraulic medium is, however, placed under pressure (namely by initiating braking pressure) then in this way the two membranes 5a, 5b are moved toward one another with simultaneous diminution of hollow space 7'. With a further increase in pressure in the hydraulic system, the two membranes 5a, 5b of membrane unit 5' are deformed to the extent that they finally lie on each other (more or less holohedrally). Here, independently of this described deformation of the membranes 5a, 5b, the braking force is further transferred by the hydraulic medium to the entire surface or front side 1c of the carrier element 1 or brake piston 1, that is, independently from the deformation of the membranes 5a, 5b described, the brake piston 1 is displaced in the brake saddle along central axis 3 with its front side 1c in the direction of its front side 1a.

The deformation of membranes 5a, 5b of membrane unit 5' nonetheless acts in such a way that vibrations in the hydraulic system of the motor vehicle brake installation acting on the front side 1c of the carrier element 1 and consequently also on membrane unit 5' are successfully dampened with the vibration damper formed through this membrane unit, with the preferably evacuated hollow space 7' lying in between until the two membranes 5a, 5b basically come to lie completely or holohedrally on each other under the action of the hydraulic pressure. If the hydraulic pressure is nonetheless less than this value, then the membranes will at least seek to shift pressure fluctuations in the hydraulic system, at least in their central region, that is, regarded temporally, the membranes 5a, 5b alternatively move toward and away from each other. With suitable coordination of the relevant dimensions, this can produce an effective vibration damping.

For example, the thickness of the membranes 5a, 5b, for example, consisting of nickel steel or NiBe can lie in the order of magnitude from 0.3 mm to 1.0 mm. Advantageously, a vibration damper of this type operates only in the actually needed value range of the (variable) pressure prevailing in the hydraulic system, for example in the range from ca. 2 bar to ca. 20 bar. With higher hydraulic pressures, as already mentioned, the two membranes 5a, 5b can basically lie holohedrally on each other so that no influence on the braking behavior of the overall system is to be feared. It should once again be mentioned in particular at this point that the vibration damper formed by this membrane unit 5' in no way adulterates the transfer of braking force from the hydraulic medium to the carrier element 1/brake piston 1 since the hydraulic medium can act through the intermediate spaces 11 between the bars 9 on the entire surface of front side 1c of brake piston 1.

For further enlargement of the effective surface of the vibration damper of the invention, membranes 5a, 5b are constructed wave-like regarded in cross section in certain areas. Since, as already mentioned, it is not only a matter of a circular depression 2 in the cylindrical carrier element 1, but also is a question of membranes 5a, 5b basically circular in top view, the wave tips 4a or the wave troughs 4b of these wave-like membrane surfaces obviously likewise describe circles. With the embodiment according to FIGS. 2a, 2b, the membranes 5a, 5b are constructed such or synchronously arranged in relation to each other such that their wave tips 4a are rectified toward one another, that it, engage into each other when the hollow space 7' is diminished. In contrast, with the embodiment according to FIGS. 1a, 1b, the wave tips 4a aligned opposite to one another lie almost a synchronously, that is, when hollow space 7' is diminished, the wave tips 4a impinge upon one another.

Figure 1B:
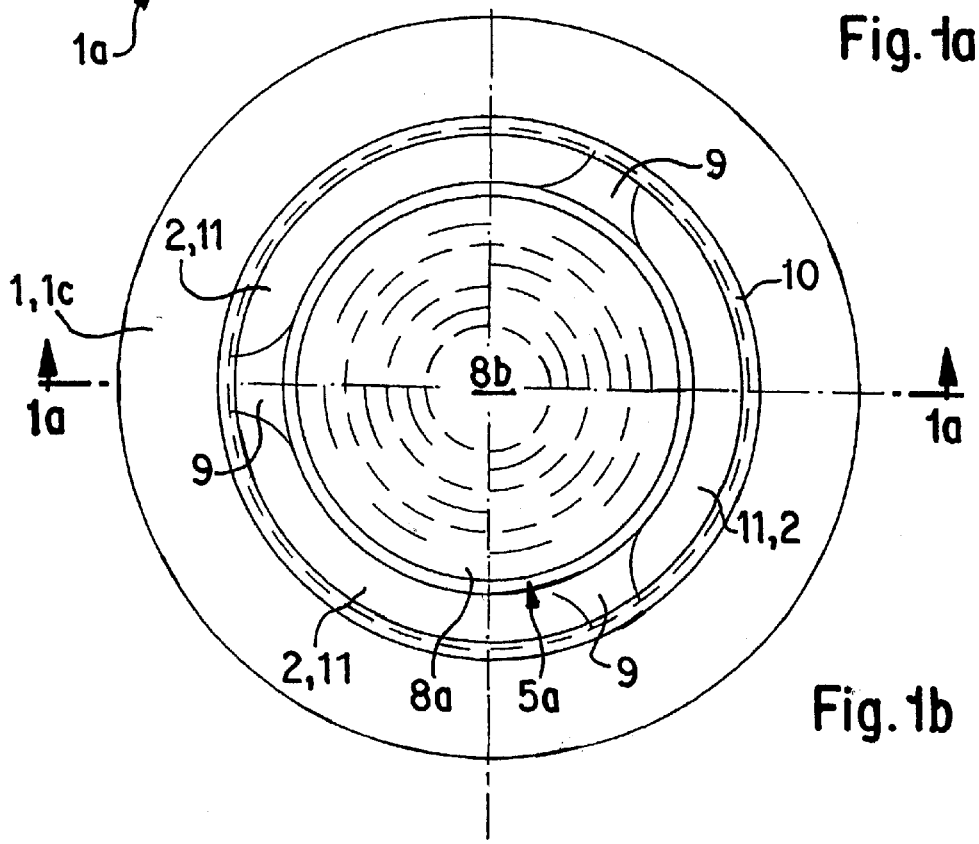
FIG. 1b shows an view of the first vibration damper of the invention

While in the embodiment according to FIGS. 2a, 2b, with correspondingly high hydraulic pressure the two membranes 5a, 5b can lie practically holohedrally on one another; this is not the case in connection with the embodiment according to FIGS. 1a, 1b. With the latter embodiment, consequently at least a small vibration damping can be achieved even with very high pressure values in the hydraulic medium, which is not the case with the former embodiment with membranes 5a, 5b which basically lie holohedrally on each other. Independently of the respective embodiment, it should once again be pointed out in this connection that independently of the height of the pressure prevailing in the hydraulic medium, the membrane unit 5' as a whole is not significantly stressed with regard to its fastening on brake piston 1/carrier element 1 since this hydraulic pressure acts on both membranes 5a, 5b from outside and moreover in the opposite direction. Consequently, no especially high mechanical standard is imposed on the so-called fastening section 6' of membrane unit 5', or basically on the bars 9.

As regards the dimensioning of the evacuated hollow space 7', which is also defined by the wave-like configuration of membranes 5a, 5b or deliberately subject to influence, the distance (measured vertically in the figure representations) between the membranes 5a, 5b not acted upon with hydraulic pressure (that is, in the basically unstressed state of the same) in the center of central region 8b (that is, in the direct vicinity of central axis 3) is greater than near the annular edge section 8a. It should be pointed out finally that throughout, a large number of details can be configured deviating from the embodiment illustrated without departing from the content of the patent claims. For example, the hollow space 7' between membranes 5a, 5b can also be filled with a suitable compressible medium. Furthermore, the carrier element 1 need not be a brake piston 1, but can also be located on other suitable locations in the hydraulic system or in the hydraulic brake installation.

What is claimed is:

1. A vibration damper for a hydraulic motor vehicle brake installation with a membrane facing a hydraulic medium transferring a braking force, the membrane being fastened via an edge region to a carrier element functioning as a brake piston in a brake caliper of a motor vehicle, and the membrane being movable at least slightly toward the carrier element or away from the carrier element in a central region, wherein the membrane together with a further membrane form a membrane unit, whereby the two membranes, substantially arranged one over another, are fastened to each other at an annular edge section, lie tightly upon each other and enclose a hollow space between each other in the central region within the edge section.

2. A vibration damper according to claim 1, wherein the further membrane facing the carrier element is set at a distance apart from a fastening section of the membrane unit.

3. A vibration damper according to claim 2, wherein a second space is provided between the surface of the carrier element and the further membrane facing the surface of the carrier element, whereby the second space stands in fluid connection with the hydraulic medium.

4. A vibration damper according to claim 1, wherein the hollow space between the two membranes is substantially evacuated.

5. A vibration damper according to claim 2, wherein the hollow space between the two membranes is substantially evacuated.

6. A vibration damper according to claim 3, wherein the hollow space between the two membranes is substantially evacuated.

7. A vibration damper according to claim 1, wherein the membrane unit is fastened in a groove provided in the carrier element at an edge of a recess.

8. A vibration damper according to claim 2, wherein the membrane unit is fastened in a groove provided in the carrier element at an edge of a recess.

9. A vibration damper according to claim 3, wherein the membrane unit is fastened in a groove provided in the carrier element at an edge of a recess.

10. A vibration damper according to claim 4, wherein the membrane unit is fastened in a groove provided in the carrier element at an edge of a recess.

11. A vibration damper according to claim 1, wherein the membrane unit is fastened on the carrier element in a manner of a bayonet lock.

12. A vibration damper according to claim 2, wherein the membrane unit is fastened on the carrier element in a manner of a bayonet lock.

13. A vibration damper according to claim 3, wherein the membrane unit is fastened on the carrier element in a manner of a bayonet lock.

14. A vibration damper according to claim 4, wherein the membrane unit is fastened on the carrier element in a manner of a bayonet lock.

15. A vibration damper according to claim 7, wherein the membrane unit is fastened on the carrier element in a manner of a bayonet lock.

16. A vibration damper according to claim 1, wherein, in a substantially unstressed state, the distance between the two membranes forming the hollow space is greater in a center of the central region than near the annular edge section.

17. A vibration damper according to claim 2, wherein, in a substantially unstressed state, the distance between the two membranes forming the hollow space is greater in a center of the central region than near the annular edge section.

18. A vibration damper according to claim 3, wherein, in a substantially unstressed state, the distance between the two membranes forming the hollow space is greater in a center of the central region than near the annular edge section.

19. A vibration damper according to claims 4, wherein, in a substantially unstressed state, the distance between the two membranes forming the hollow space is greater in a center of the central region than near the annular edge section.

20. A vibration damper according to claim 7, wherein, in a substantially unstressed state, the distance between the two membranes forming the hollow space is greater in a center of the central region than near the annular edge section.

21. A vibration damper according to claim 11, wherein, in a substantially unstressed state, the distance between the two membranes forming the hollow space is greater in a center of the central region than near the annular edge section.

22. A vibration damper according to claim 1, wherein the two membranes are constructed with wave cross sections in areas.

23. A vibration damper according to claim 2, wherein the two membranes are constructed with wave cross sections in areas.

24. A vibration damper according to claim 3, wherein the two membranes are constructed with wave cross sections in areas.

25. A vibration damper according to claim 4, wherein the two membranes are constructed with wave cross sections in areas.

26. A vibration damper according to claim 7, wherein the two membranes are constructed with wave cross sections in areas.

27. A vibration damper according to claim 11, wherein the two membranes are constructed with wave cross sections in areas.

28. A vibration damper according to claim 16, wherein the two membranes are constructed with wave cross sections in areas.

29. A vibration damper for a hydraulic system, comprising:

a carrier element adapted to function as a hydraulic piston, a first membrane facing a hydraulic medium which transfers a force, said first membrane being fastened to the carrier element via an edge region and movable at least slightly toward or away from the carrier element in a central region, and a second membrane arranged below the first membrane, and with the first membrane forms a membrane unit, the first and second membranes being fastened to each other at an annular edge and within the edge region, enclosing a hollow space between each other in the central region.

30. A vibration damper according to claim 29, wherein the membrane unit includes a fastening section which connects to the carrier element.

31. A vibration damper according to claim 30, wherein the second membrane is located a distance apart from the fastening section.

32. A vibration damper according to claim 31, wherein a further space is provided between the second membrane and a surface of the carrier element facing the second membrane whereby the further space is in fluid communication with the hydraulic medium.

33. Method of making a vibration damper for a hydraulic brake installation, comprising:

fastening a first membrane, which faces a hydraulic medium transferring a braking force, with a second membrane at an annular edge section to form a membrane unit, and fastening the membrane unit via an edge region to a carrier element, which is adapted to function as a brake piston in a brake caliper of a motor vehicle, wherein the first membrane is movable at least slightly toward or away from the carrier element in.a central region, and wherein the two membranes are arranged approximately one over another and enclose a hollow space between each other within the annular edge section.

34. Method according to claim 33, wherein the membrane unit is located a distance apart from a fastening section of the edge region and from a surface of the carrier element.

35. Method according to claim 34, wherein a second space is provided between the second membrane and the surface of the carrier element facing the second membrane, the second space being in fluid connection with the hydraulic medium.

* * * * *